(12) United States Patent
Schulze

(10) Patent No.: US 8,973,624 B2
(45) Date of Patent: Mar. 10, 2015

(54) COMPRESSED HYDROGEN FUELING CONTROL VALVE

(75) Inventor: Jörg Schulze, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 833 days.

(21) Appl. No.: 13/014,907

(22) Filed: Jan. 27, 2011

(65) Prior Publication Data

US 2012/0192989 A1   Aug. 2, 2012

(51) Int. Cl.
*B65B 1/30* (2006.01)
*H01M 8/04* (2006.01)
*H01M 8/10* (2006.01)

(52) U.S. Cl.
CPC ............ *H01M 8/04753* (2013.01); *Y02E 60/50* (2013.01); *H01M 2008/1095* (2013.01)
USPC ................... 141/192; 141/1; 141/39; 141/40; 141/301

(58) Field of Classification Search
CPC ................................. F17C 5/007; F17C 5/06
USPC ........... 141/1, 39, 40, 192, 197, 198, 215, 94, 141/95, 59, 301, 302
See application file for complete search history.

(56) References Cited

U.S. PATENT DOCUMENTS

| | | | |
|---|---|---|---|
| 2,879,809 A * | 3/1959 | Vogt ................................. | 141/12 |
| 2,997,207 A * | 8/1961 | Botkin et al. .................... | 222/59 |
| 3,076,486 A * | 2/1963 | Abbey et al. .................. | 141/207 |
| 3,421,541 A * | 1/1969 | Steeneken ...................... | 137/491 |
| 3,799,218 A * | 3/1974 | Douglass ......................... | 141/18 |
| 4,454,894 A * | 6/1984 | Tallon ................................. | 96/4 |
| 5,238,030 A * | 8/1993 | Miller et al. ...................... | 141/4 |
| 5,282,497 A * | 2/1994 | Allison ........................... | 141/59 |
| 5,474,104 A * | 12/1995 | Borland et al. ............... | 137/381 |
| 5,564,306 A * | 10/1996 | Miller ............................. | 73/861 |
| 5,628,349 A * | 5/1997 | Diggins et al. ..................... | 141/3 |
| 5,785,082 A * | 7/1998 | Geis et al. ............... | 137/516.29 |
| 6,095,204 A * | 8/2000 | Healy ............................. | 141/59 |
| 6,598,624 B2 * | 7/2003 | Togasawa et al. ................. | 141/1 |
| 6,845,965 B2 * | 1/2005 | Lanting et al. ................ | 251/175 |
| 7,114,699 B2 * | 10/2006 | Hull et al. ..................... | 251/121 |
| 7,152,637 B2 * | 12/2006 | Hoke, Jr. ........................ | 141/192 |
| 7,182,108 B2 * | 2/2007 | Williamson ..................... | 141/20 |
| 7,191,805 B2 * | 3/2007 | Cohen et al. ........................ | 141/4 |
| 2002/0170617 A1 * | 11/2002 | Veenstra et al. ................ | 141/94 |
| 2005/0067047 A1 * | 3/2005 | Williamson ..................... | 141/39 |
| 2007/0079892 A1 * | 4/2007 | Cohen et al. .................. | 141/105 |
| 2007/0154752 A1 * | 7/2007 | McElroy et al. ................ | 429/22 |
| 2010/0175778 A1 * | 7/2010 | Adler et al. ........................ | 141/4 |
| 2012/0291902 A1 * | 11/2012 | Mori et al. ...................... | 138/40 |
| 2013/0146176 A1 * | 6/2013 | Yahashi et al. ..................... | 141/4 |

* cited by examiner

*Primary Examiner* — Timothy L Maust
(74) *Attorney, Agent, or Firm* — Fraser Clemens Martin & Miller LLC; James D. Miller

(57) ABSTRACT

A fill control system includes a fuel storage vessel, a fuel inlet in fluid communication with the fuel storage vessel to provide fluid communication between a fuel source and the fuel storage vessel, and a fill control valve disposed between and in fluid communication with the fuel inlet and the fuel storage vessel, an actuation of the fill control valve causing a pressure level upstream thereof which emulates a full condition of the fuel storage vessel.

5 Claims, 1 Drawing Sheet

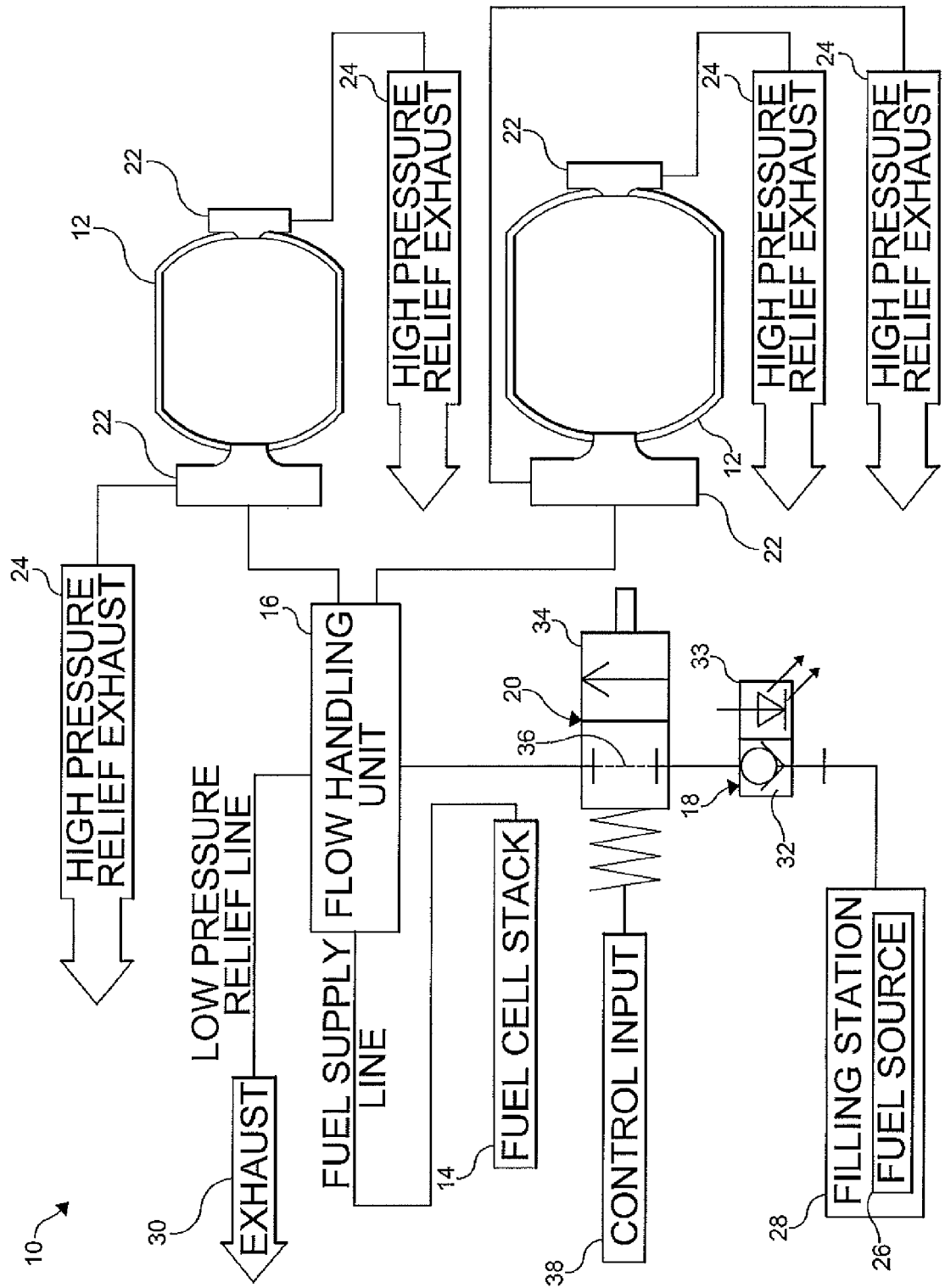

COMPRESSED HYDROGEN FUELING CONTROL VALVE

FIELD OF THE INVENTION

The present invention relates generally to a control valve for a fueling operation. In particular, the invention is directed to a control valve for a compressed hydrogen system and a method for fueling the compressed hydrogen system.

BACKGROUND OF THE INVENTION

Fuel cell power systems have been proposed as a clean, efficient and environmentally responsible power source for electric vehicles and various other applications. One type of fuel cell power system employs use of a proton exchange membrane (PEM) to catalytically facilitate a reaction of fuels (such as hydrogen) and oxidants (such as air or oxygen) into electricity. Typically, the fuel cell power system has more than one fuel cell that includes an anode and a cathode with the PEM therebetween. The anode receives the hydrogen gas and the cathode receives the oxygen. The hydrogen gas is ionized in the anode to generate free hydrogen ions and electrons. The hydrogen ions pass through the electrolyte to the cathode. The hydrogen ions react with the oxygen and the electrons in the cathode to generate water as a by-product. The electrons from the anode cannot pass through the PEM, and are instead directed through a load to perform work before being sent to the cathode. The work acts to operate the vehicle. Many fuels cells are combined in a fuel cell stack to generate the desired power.

The hydrogen gas for the fuel cell power system can be processed separate from the vehicle and stored at a filling station and the like. The hydrogen gas may be transferred from the filling station to a high pressure vessel or container on the vehicle to supply the desired hydrogen gas to the fuel cell system as needed. The high pressure vessels are typically classified into one of four types: a Type I vessel having an all-metal construction; a Type II having a metal lined construction with a fiberglass hoop wrap; a Type III having a metal lined construction with a composite full wrap; and a Type IV having a plastic lined construction with a composite full wrap.

Current fueling operations for fuel cell vehicles are controlled (e.g. stopped) by the fueling station. Conventional vehicles and fuel cell systems are not equipped to control a delivery of a fuel from an outside source. For example, when a hydrogen storage system is "out of spec" (e.g. a temperature is beyond a suitable range) during a fueling operation, the vehicle could not interrupt the fueling independently from the filling station.

Certain systems include a valve that can be closed in order to prevent the delivery of the fuel into the system. However, a differential pressure can build across a closed valve and actuating a valve under high differential pressure minimizes an operational life of the valve.

It would be desirable to develop a fill control system having a valve to control a fueling operation without shutting a fuel line.

SUMMARY OF THE INVENTION

Concordant and consistent with the present invention, a fill control system having a valve to control a fueling operation without shutting a fuel line, has surprisingly been discovered.

In one embodiment, a fill control system comprises: a fuel storage vessel; a fuel inlet in fluid communication with the fuel storage vessel to provide fluid communication between a fuel source and the fuel storage vessel; and a fill control valve disposed between and in fluid communication with the fuel inlet and the fuel storage vessel, an actuation of the fill control valve causing a pressure level upstream thereof which emulates a full condition of the fuel storage vessel.

In another embodiment, a fill control system comprises: a fuel storage vessel; a fuel cell stack in fluid communication with the fuel storage vessel to receive a supply of a fuel from the fuel storage vessel; a flow handling unit in fluid communication with the fuel storage vessel and the fuel cell stack to direct a flow of the fuel between at least the fuel storage vessel and the fuel cell stack; a fuel inlet in fluid communication with the flow handling unit to provide fluid communication between a fuel source and the fuel storage vessel through the flow handling unit; and a fill control valve disposed between and in fluid communication with the fuel inlet and the flow handling unit, an actuation of the fill control valve causing a pressure level upstream thereof which emulates a full condition of the fuel storage vessel.

The invention also provides methods of controlling a filling operation.

One method comprises the steps of: actuating a fill control valve to generate a pressure level upstream of the fill control valve, the pressure level emulating a full condition of the fuel storage vessel; sensing the pressure level upstream of the fill control valve; and adjusting a flow rate of a fuel delivered to the fill control valve in response to sensing the pressure level upstream of the fill control valve.

BRIEF DESCRIPTION OF THE DRAWINGS

The above, as well as other advantages of the present invention, will become readily apparent to those skilled in the art from the following detailed description of the preferred embodiment when considered in the light of the accompanying drawing which is a schematic representation of a fill control system according to an embodiment of the present invention.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

The drawing illustrates a fill control system 10 according to an embodiment of the present invention. As shown, the system 10 includes a pair of fuel storage vessels 12, a fuel cell stack 14 in fluid communication with each of the fuel storage vessels 12, a flow handling unit 16 (i.e. gas/fuel handling unit) in fluid communication with the fuel storage vessels 12 and the fuel cell stack 14, a fuel inlet 18 in fluid communication with the fuel handling unit 16, and a fill control valve 20 in fluid communication with the fuel inlet 18 and the fuel handling unit 16, wherein the fill control valve 20 controls a pressure drop between the fuel inlet 18 and a point downstream of the fill control valve 20.

Each of the fuel storage vessels 12 is typically a high pressure vessel for storing hydrogen gas, for example. As a non-limiting example, the each of the fuel storage vessels 12 is one of: a Type I vessel having an all-metal construction; a Type II vessel having a metal lined construction with a fiberglass hoop wrap; a Type III vessel having a metal lined construction with a composite full wrap; and a Type IV vessel having a plastic lined construction with a composite full wrap, as appreciated by one skilled in the art. However, each of the fuel storage vessels 12 can be any vessel suitable for storing any fuel. It is understood that the fuel storage vessels 12 can have any size and shape. It is further understood that any number of the fuel storage vessels 12 can be used.

Each of the fuel storage vessels 12 is typically in fluid communication with at least the fuel inlet 18 and the fuel cell stack 14 (e.g. through the flow handling unit 16). As a non-limiting example, a plurality of on-tank valves (OTVs) 22 provides fluid intercommunication between the fuel storage vessels 12 and at least the fuel inlet 18 and the fuel cell stack 14. It is understood that the OTVs 22 may be mounted to the fuel storage vessels 12 and include additional components, such as an automatic shut-off valve, a manual valve, a temperature sensor, and a pressure sensor. Other suitable means for placing at least the fuel inlet 18 and the fuel cell stack 14 in fluid communication with the fuel storage vessels 12 may also be employed. It is further understood that at least one of the OTVs 22 can provide fluid communication between at least one of the fuel storage vessels 12 a high pressure relief exhaust 24.

The fuel cell stack 14 is typically in fluid communication with at least one of the fuel storage vessels 12 to receive a flow of fuel (e.g. hydrogen) therefrom. As a non-limiting example, the fuel cell stack 14 includes a plurality of PEM fuel cells (not shown). However, other fuel cell stacks, systems, and/or engines can be used and configured to receive a flow of fuel from at least one of the fuel storage vessels 12.

In certain embodiments, the flow handling unit 16 is in fluid communication with the fuel storage vessels 12 and the fuel cell stack 14 to direct a flow of the fuel between at least the fuel storage vessels 12 and the fuel cell stack 14. As a non-limiting example, the flow handling unit 16 is in fluid communication with the fuel inlet 18 to provide fluid communication between a fuel source 26 (e.g. at a filling station 28) and the fuel storage vessels 12. As a further non-limiting example, the flow handling unit 16 is in fluid communication with an exhaust 30 for at least a low pressure relief.

The fuel inlet 18 is in fluid communication with at least one of the fuel storage vessels 12 to provide fluid communication between the fuel source 26 and the at least one of the fuel storage vessels 12. In certain embodiments, the fuel inlet 18 is in fluid communication with the flow handling unit 16 to provide fluid communication between the fuel source 26 and the at least one of the fuel storage vessels 12 through the flow handling unit 16. As a non-limiting example, the fuel inlet 18 includes a receptacle 32 for receiving a dispensing device (not shown) to provide fluid communication between the fuel source 26 and the fuel inlet 18. As a further non-limiting example, the fuel inlet 18 includes a communication device 33 (e.g. an infrared data interface) to communicate with at least one of the fuel source 26 and the filling station 28 to provide a feedback to the at least one of the fuel source 26 and the filling station 28 relating to a status of the system 10 (e.g. fuel level of the fuel storage vessels 12). It is understood that any data can be intercommunicated between the communication device 33 and the at least one of the fuel source 26 and the filling station 28 to control an operation of the at least one of the fuel source 26 and the filling station 28. It is further understood that the communication device 33 can be positioned anywhere in the system 10.

The fill control valve 20 is in fluid communication with the fuel inlet 18 and at least one of the fuel storage vessels 12, wherein the fill control valve 20 controls a pressure drop between the fuel inlet 18 and the at least one of the fuel storage vessels 12. As a non-limiting example, the fill control valve 20 controls a difference in pressure upstream and downstream of the fill control valve 20 by adjusting a flow rate (i.e. a resistance to flow) therethrough. In the embodiment shown, the fill control valve 20 is downstream of the fuel inlet 18 and upstream of the flow handling unit 16, wherein a flow of fuel from the fuel inlet 18 must pass through the fill control valve 20 to reach the flow handling unit 16. However, other flow paths and bypasses can be included.

The fill control valve 20 typically includes a main flow path 34 and a bleed path 36 passing therethough. A flow rate through the main flow path 34 is adjustable and thereby controls a pressure drop between a point upstream of the fill control valve 20 and a point downstream of the fill control valve 20. In certain embodiments, the fill control valve 20 is a powered valve. As a non-limiting example, the fill control valve 20 includes a control input 38 to receive a control signal, the fill control valve 20 adjusting the flow rate through the main flow path 34 in response to the control signal. It is understood that the control signal can include any signal data including data relating to a condition or characteristic (e.g. fill level, temperature, pressure, error status, etc.) of at least one of the fuel storage vessels 12, the fuel cell stack 14, and the flow handling unit 18, for example. It is further understood that the fill control valve 20 can be actuated using any technique (automatic or manual) and based on any data or information.

The bleed path 36 through the fill control valve 20 is configured to provide a pre-determined minimum flow rate of fluid therethrough. It is understood that the bleed path 36 effectively limits a pressure differential between a point upstream and a point downstream of the fill control valve 20. It is further understood that the minimum flow rate of the bleed path 36 can be set to any level.

In use, the receptacle 32 of the fuel inlet 18 receives a dispensing device to deliver a flow of fuel (e.g. hydrogen). The fuel flows from the fuel source 26 through the receptacle 32 and passes through the fill control valve 20. In certain embodiments, the fuel flows from the fill control valve 20 to the flow handling unit 16, wherein the fuel is directed to a destination (e.g. the fuel storage vessels 12). However, it is understood that the fuel can flow directly from the fill control valve 20 to at least one of the fuel storage vessels 12.

Typically, the communication device 33 communicates with the filling station 28 to control a rate of flow of the fuel from the fuel source 26 into the fuel storage vessels 12. However, under certain conditions (e.g. out of specification, error, fault, at the like) the fuel storage vessels 12 are not suitable for receiving the flow of the fuel.

Instead of relying solely on the intercommunication between the communication device 33 and the filling station 28 to control a flow rate of the fuel entering the system 10, the fill control valve 20 can be actuated to control a pressure drop across the fill control valve 20. As a non-limiting example, if a temperature of the system 10 is beyond a pre-determined threshold, the fill control valve 20 can be actuated to maximize a pressure drop across the fill control valve 20. Accordingly, the filling station 28 detects a pressure build-up that indicates a "full tank" status and stops the filling operation (i.e. delivery of the fuel). In other words, an actuation of the fill control valve 20 causes a pressure level upstream thereof which emulates a full condition of the fuel storage vessel. It is understood that regardless of the pressure drop/pressure level created by the fill control valve 20, the bleed path 36 provides a through-path to substantially equalize a pressure differential between a point upstream of the fill control valve 20 and a point downstream of the fill control valve 20. Therefore, the fill control valve 20 will not be actuated under unsuitably high differential pressure conditions that plague the valves in the art and reduce operational life of the conventional valves. Once conditions of the system 10 are appropriate, the fill control valve 20 is actuated to allow a flow of fuel into the system 10 to appropriately fill the fuel storage vessels 12.

The present invention provides the fill control valve 20 for interruption of a fueling operation of a vehicle by increasing a pressure drop across the fill control valve 20 without a fluid-tight shut off or seal, which conventionally creates a high differential pressure across a valve.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A method of controlling a filling operation comprising the steps of:
    actuating a fill control valve to generate a pressure level upstream of the fill control valve, the pressure level emulating a full condition of a fuel storage vessel, the fill control valve including a bleed path formed therein, the bleed path configured to provide a pre-determined minimum flow rate of fluid therethrough wherein the pressure level upstream is accomplished without a fluid-tight shut off or seal of the fill control valve;
    sensing the pressure level upstream of the fill control valve; and
    adjusting a flow rate of a fuel delivered to the fill control valve in response to sensing the pressure level upstream of the fill control valve.

2. The method according to claim 1, wherein the fill control valve is disposed between and in fluid communication with a fuel storage vessel and a fuel inlet.

3. The method according to claim 1, wherein the bleed path is in fluid communication with a fuel inlet and a flow handling unit.

4. The method according to claim 1, wherein the fill control valve includes a control input to receive a control signal, the fill control valve adjusting the pressure drop in response to the control signal.

5. The method according to claim 1, wherein the flow of fuel to the fill control valve is delivered by a filling station, the filling station configured to sense the pressure level upstream of the fill control valve and adjust the flow rate of the fuel delivered to the fill control valve in response to the pressure level sensed.

* * * * *